United States Patent [19]

Olson

[11] 4,205,938

[45] Jun. 3, 1980

[54] PUSH-PULL ASSEMBLY FOR LIFT TRUCKS

[75] Inventor: John E. Olson, Portland, Oreg.

[73] Assignee: Cascade Corporation, Portland, Oreg.

[21] Appl. No.: 954,894

[22] Filed: Oct. 26, 1978

[51] Int. Cl.$^2$ .............................................. B60P 1/18

[52] U.S. Cl. .................................... 414/497; 414/661

[58] Field of Search ............... 414/659, 639, 661, 642, 414/495, 622, 497, 491-493, 513, 517, 509; 280/43.12

[56] References Cited

U.S. PATENT DOCUMENTS

| | | | |
|---|---|---|---|
| Re. 28,623 | 11/1975 | Brudi | 414/661 |
| 2,620,936 | 12/1952 | Abbe | 414/661 |
| 3,495,730 | 2/1970 | Rigsby | 414/497 X |
| 3,532,239 | 10/1970 | May | 414/642 |
| 3,567,054 | 3/1971 | Emke | 414/639 |
| 3,666,128 | 5/1972 | Shimizu | 414/661 |
| 3,885,692 | 5/1975 | Anderson, Jr. | 414/660 |
| 4,065,012 | 12/1977 | Rocco | 414/497 X |

FOREIGN PATENT DOCUMENTS

| | | | |
|---|---|---|---|
| 1556041 | 1/1970 | Fed. Rep. of Germany | 414/622 |

*Primary Examiner*—L. J. Paperner
*Assistant Examiner*—Terrance L. Siemens
*Attorney, Agent, or Firm*—Chernoff & Vilhauer

[57] ABSTRACT

A load push-pull assembly for a lift truck having a main frame and a tiltable load-supporting frame. The push-pull assembly comprises a push frame connected by a selectively extensible and retractable linkage to a rear mounting frame which does not tilt in unison with the tiltable load-supporting frame but rather maintains a constant angular attitude with respect to the truck-supporting surface regardless of the tilting attitude of the load-supporting frame. The linkage maintains the push frame in a constant angular attitude with respect to the rear mounting frame such that the push frame is maintained perpendicular with respect to the truck-supporting surface during the tilting of the load-supporting frame. The push frame is freely movable vertically with respect to the rear mounting frame, and is supported vertically by the tiltable load-supporting frame, such that it moves vertically with a rectilinear motion in response to the tilting movement of the load-supporting frame without changing its angular attitude with respect to the truck-supporting surface. A slip sheet clamp is mounted on the bottom of the push frame such that both jaws of the clamp move vertically in unison with the vertical movement of the push frame.

19 Claims, 4 Drawing Figures

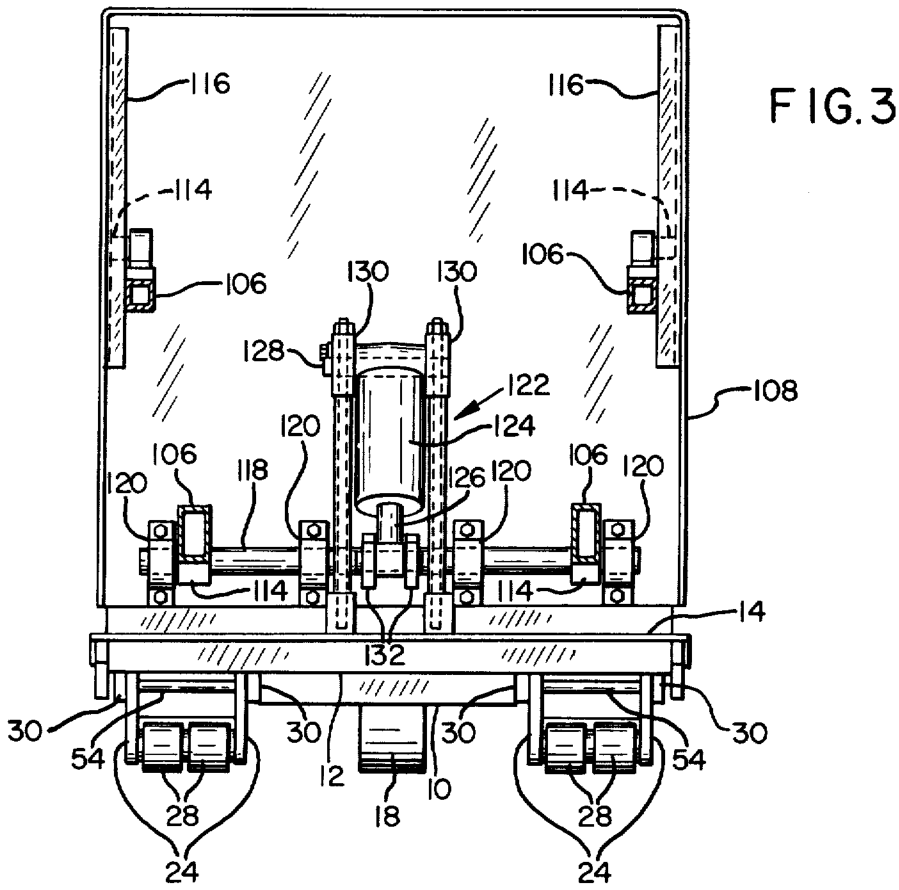
FIG. 3
FIG. 4
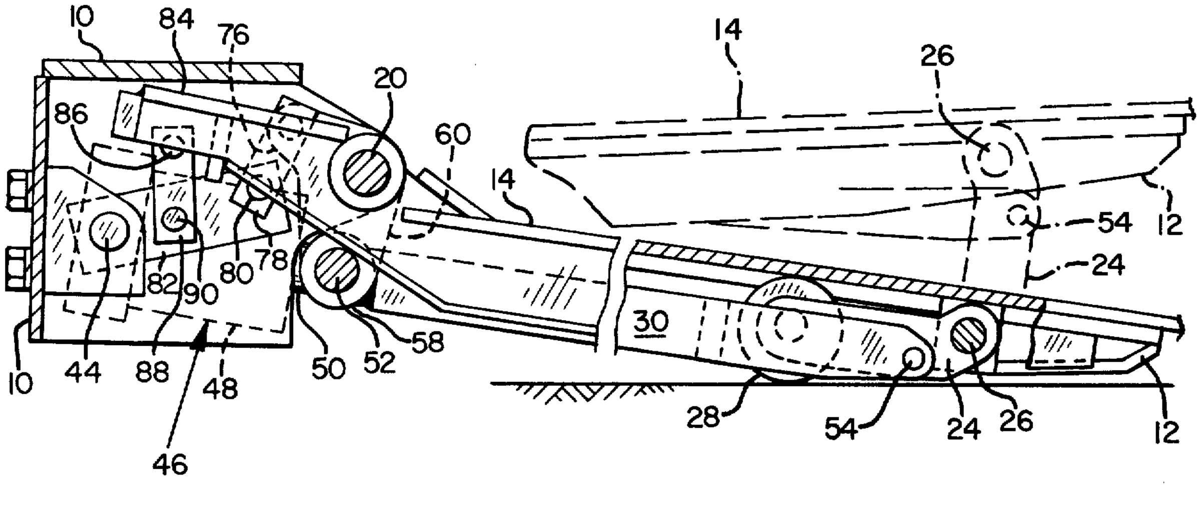

PUSH-PULL ASSEMBLY FOR LIFT TRUCKS

BACKGROUND OF THE INVENTION

The present invention relates to improvements in load pushing and push-pull assemblies for lift trucks, and in particular to improvements in mechanisms for controlling the angular attitude and vertical position of pushing or push-pull frames.

In the lift truck handling of certain types of loads, such as unpalletized boxes or stacks of cartons, it is common procedure to utilize a selectively extensible and retractable push frame atop a tiltable load-supporting frame (such as load forks or a platen) so that the load may be deposited by tilting the load-supporting frame downward and pushing the load forwardly off of the tilted frame onto the floor through extension of the push frame. During the pushing motion, it is desirable to apply the major thrust near the bottom of the load in order to avoid pushing deformable stacks of cartons out of vertical alignment.

Push frames are commonly used in conjunction with a selectively openable and closeable clamp adjacent the bottom of the push frame for gripping the edge of a slip sheet positioned beneath the load and, by retraction of the push frame and clamp, pulling the load onto the downwardly tilted load-supporting frame. When the push frame is equipped with such a clamp, the assembly is normally referred to as a push-pull assembly since it is capable of accomplishing two functions rather than merely the pushing function. The pulling function, however, is rendered difficult in most push-pull assemblies because the downward tilt of the load-supporting frame, necessary to pick up the load, also dictates that the push frame assume an angular attitude other than perpendicular to the warehouse floor or other surface supporting both the load and the lift truck. This is due to the fact that push frames have, in the past, always been supportably mounted with respect to the load-supporting frame such that, when the angular attitude of the load-supporting frame is changed by tilting it, the angular attitude of the push frame is likewise changed because the load-supporting frame and push frame tilt in unison. This tilting in unison occurs regardless of whether the truck is of the high-lift type, as shown for example in Anderson, Jr. U.S. Pat. No. 3,885,692 and Brudi U.S. Pat. No. Re. 28,623, or is a low-lift truck of the type shown in Rigsby U.S. Pat. No. 3,495,730 and Rocco U.S. Pat. No. 4,065,012.

With structures such as those shown in the Anderson, Jr. and Rocco patents, the push frame is tilted forwardly and downwardly when the load-supporting frame is tilted downwardly to pick up or deposit a load. This tilting of the push frame positions the bottom of the push frame, when extended, in close proximity with the forward end of the downwardly tilted load-supporting frame, which is particularly necessary in order to depress the fixed bottom jaw of a slip sheet clamp sufficiently to engage the edge of a slip sheet. However, when the push frame is extended for either the pushing or pulling function, the push frame is askew with respect to the vertical side of the load causing deformation of deformable vertical stacks and, because the upper end of the push frame encounters the upper end of the vertical side of the load before the clamp is close enough to the bottom of the load to grasp the slip sheet, severely hampering the pulling function.

This problem is partially solved by a structure such as that shown in the above-identified Brudi patent wherein the geometry of the extension and retraction linkage is such as to forcibly tilt the push frame rearwardly upon extension so as to compensate for the downward tilt of the load-supporting frame and push frame assembly. However verticality with respect to the truck-supporting surface can be achieved by this means in only one particular tilting angle of the load-supporting frame, and not at all tilting angles, because the push frame still tilts in unison with the load-supporting frame. This same disadvantage is true of the device shown in the Rigsby patent.

In handling slip sheet-supported loads, it is often necessary to pick up or deposit the load while the main frame of the truck is supported on a surface which is elevated or depressed with respect to the surface upon which the load is supported or is to be placed. This can occur for example at the interface between a loading dock and a truck bed, or when a slip sheet-supported load is placed upon a pallet. Under these circumstances the tilting attitude of the load-supporting frame with respect to the main frame of the lift truck will vary greatly when picking up or depositing a load. In fact in those cases where the load-supporting surface is higher than the truck-supporting surface, the load-supporting frame may not be tilted downwardly at all during load deposit or pick up. Accordingly those assemblies which achieve verticality of the push frame in the extended position, but only at a particular tilting attitude of the load-supporting frame, provide inadequate flexibility of the truck to satisfy the varied load-handling situations likely to be encountered.

What is needed therefore are load-pushing and push-pull assemblies which maintain the push frame in a substantially constant angular attitude with respect to the truck-supporting surface, especially in the extended position of the push frame, in all tiltable positions of the load-supporting frame.

SUMMARY OF THE INVENTION

The present invention provides a push frame assembly wherein the push frame is maintained in a substantially constant perpendicular angular attitude with respect to the truck-supporting surface regardless of the tilting movement of the load-supporting forks or platen. This result is obtained, particularly in the extended position of the push frame where it is of primary importance, by virtue of the fact that the push frame is mounted upon a rear mounting frame which, rather than tilting in unison with the load-supporting frame, is instead maintained in a substantially constant angular attitude with respect to the truck-supporting surface during the tilting movement of the load-supporting frame. The rear mounting frame is fixedly attached to the main frame of the lift truck, which is likewise maintained in a constant angular attitude with respect to the truck-supporting surface during tilting of the load-supporting frame, and extensible and retractable linkages interconnect the push frame with the rear mounting frame in such a way as to maintain the push frame, when extended, in a constant angular attitude with respect to the rear mounting frame in all tiltable positions of the load-supporting frame and, preferably, in all positions of extension or retraction of the push frame.

The problem of how to provide the necessary vertical movement of the push frame required to maintain the bottom thereof, and especially a slip sheet clamp mounted at the bottom thereof, in close proximity to the load-supporting frame in all of its tiltable positions without change of angular attitude of the push frame is solved by permitting the push frame to move in a vertical direction with rectilinear motion only. Preferably, this is accomplished by connecting the push frame to the extensible and retractable linkages by means of a coupling arrangement which permits free rectilinear vertical movement of the push frame relative to the linkages, the push frame being vertically supported by the load-supporting frame so as to move vertically in response to the tilting movement of the load-supporting frame, while being prevented by the linkages from moving angularly or tiltably in response to the tilting movement of the load-supporting frame.

Accordingly it is a principal objective of the present invention to provide a load-pushing assembly having push frame mounting apparatus for maintaining the push frame in a substantially constant angular attitude with respect to the truck-supporting surface, especially in the extended position of the push frame, regardless of the tilting movement or position of the load-supporting frame.

It is a further principal objective of the present invention to permit vertical movement of such push frame during tilting movement of the load-supporting frame without changing such constant angular attitude thereof.

It is a further objective of the invention that such constant angular attitude of the push frame be substantially perpendicular with respect to the truck-supporting surface.

The foregoing and other objectives, features and advantages of the present invention will be more readily understood upon consideration of the following detailed description of the invention taken in conjunction with the accompanying drawings.

BRIEF DESCRIPTION OF THE DRAWINGS

FIG. 3 is a sectional view taken along line 3—3 of FIG. 1 showing the front of the rear mounting frame of the push-pull assembly.

FIG. 4 is a detailed extended sectional view of an exemplary structure for maintaining the main frame of the low-lift truck at a constant angular attitude with respect to the truck-supporting surface during tilting movement of the load-supporting platen.

DESCRIPTION OF THE PREFERRED EMBODIMENT

Figure 1:
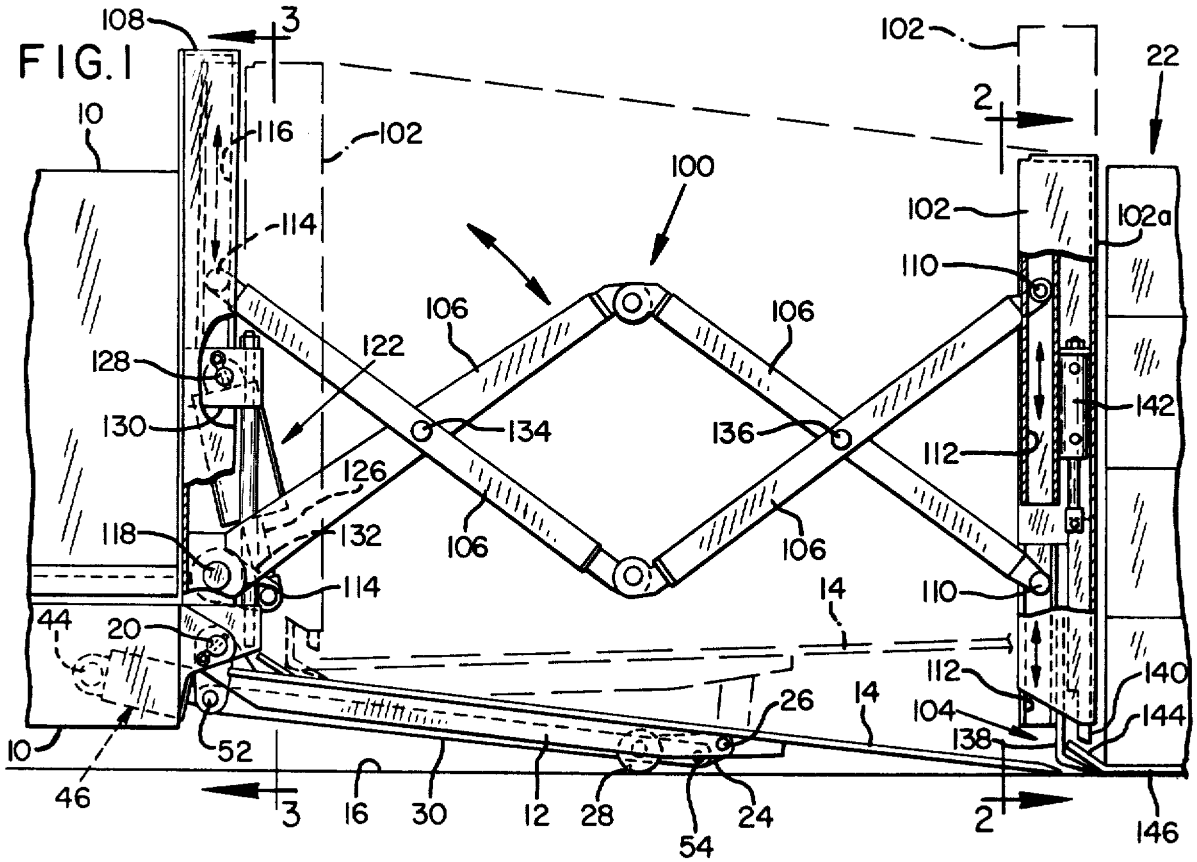
FIG. 1 is a side view of an illustrative embodiment of a push-pull assembly constructed in accordance with the present invention, shown mounted upon an exemplary low-lift truck having a tilting load platen.
Figure 2:
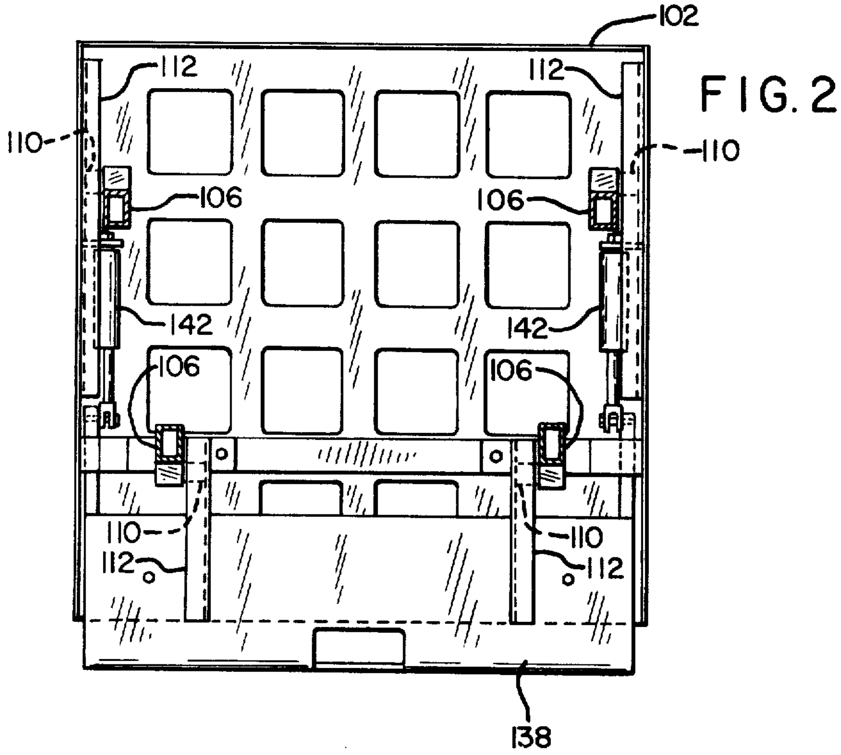
FIG. 2 is a sectional view taken along line 2—2 of FIG. 1 showing the rear of the push frame.

Referring to FIG. 1, an exemplary walkie low-lift truck is shown comprising a main frame 10 and a forwardly-extending load-supporting frame 12. The main frame 10 is oriented generally parallel to the truck-supporting surface 16 and normally carries a drive motor and associated transmission (not shown) and drive steer wheel 18 (FIG. 3). The load-supporting frame 12 is hingedly connected to the forward portion of the main frame 10 by a horizontal shaft structure such as 20 to permit the load-supporting frame 12 to articulate tiltably with respect to the main frame 10 between a lowered position shown in solid lines and a raised position shown in phantom in FIGS. 1 and 4. A platen 14 is fixedly mounted to the top of the tiltable load-supporting frame 24 and constitutes a laterally disposed, flat, load-carrying member having a downwardly tapered forward edge to allow a load 22, such as the stack of cartons illustrated in FIG. 1, to easily slide off of and onto the platen 14 when the load-supporting frame 12 is in its lowered position.

The structure for tiltably raising and lowering the load-supporting frame 12 while maintaining the main frame 10 at a constant angular attitude with respect to the load-supporting surface 16 may be varied without departing from the invention herein, the structure described in this and the following four paragraphs being presented merely by way of explanation as showing a preferred way to accomplish this purpose in a low-lift truck. The front end of the tiltable load-supporting frame 12 is supported by laterally spaced pairs of load-supporting struts 24 (FIGS. 1 and 3) pivotally mounted at their upper ends by means of transverse shafts such as 26 to the frame 12 and having load-supporting wheels 28 rotatably mounted to their depending ends. Rigidly interconnected, laterally spaced control arms 30 retract rearwardly to rotate each pair of struts 24 rearwardly in unison to move the load-supporting wheels 28 toward the main frame 10. Rearward rotation of the struts, depending upon the degree of rotation, can lower the load-supporting frame 12 and the platen 14 to various depressed positions. Conversely, forward extension of the control arms 30 and resultant forward rotation of the struts, likewise depending upon the degree of rotation, raises the frame 12 and platen 14 tiltably to a maximum raised position wherein the platen is at least substantially horizontal and preferably tilts rearwardly toward the main frame 10 as illustrated in phantom in the figures.

A pair of laterally spaced identical crank and lever assemblies, only one of which is illustrated in FIG. 4, maintain the angular attitude of the main frame 10 constant with respect to the truck-supporting surface 16 as the load-supporting frame 12 moves tiltably between its lowered and raised positions. Fixedly attached to the main frame 10 are mounting bracket and pivot shaft asssemblies such as 44 which pivotally mount a hydraulic ram 46 having a cylinder portion 48 and an extensible piston rod 50 extending forwardly from the cylinder portion 48. A cross shaft 52 extends transversely from the end of the piston rod 50 and pivotally interconnects with the rear ends of the control arms 30 and also through the lower arm 58 of a respective crank 60, the crank being mounted rotatably to the main frame 10 on a shaft 20.

As the piston rod 50 of the hydraulic ram 48 is retracted to the position illustrated in FIG. 4, two actions simultaneously and coordinately occur. First, the cross shaft 52 is pulled rearwardly and the cross shaft in turn pulls the control arms 30 rearward. The control arms 30 are connected to the load-supporting struts 24 pivotally by means of a respective shaft 54. Therefore, when the ram 46 pulls the control arms 30 rearward, the struts 24 rotate from a generally vertical position, wherein the load-supporting frame 12 is in its raised position, to a folded position wherein the load-supporting frame 12 is in its lowered position.

Second, as the piston rod 50 is retracted the cross shaft 52 pulls rearward upon the lower arm 58 of the respective crank 60, causing the crank to rotate about the shaft 20. This rotation, clockwise as seen in FIG. 4, causes the upper arm 76 of the crank 60 to move upward. The upper crank arm 76 is connected pivotally to a forward connecting link 78 which depends from the upper arm 76 and is pivotally connected at its lower end to an outer pivot joint 80 on an elongated idler lever 82. The idler lever 82 extends rearwardly to a pivotal interconnection with the main frame 10 by means of a respective pivot shaft 44, and thus pivots upward about the shaft 44 in unison with the clockwise rotation of the respective crank 60. A rearward extension portion 84 of the tiltable load-supporting frame 12, extending toward the main frame 10 beyond the respective shaft 20, connects pivotally to the idler lever 82 by means of a rear connecting link 88 connecting an inner pivot joint 90 of the idler lever with a pivot joint 86 of the rearward extension portion 84. Thus as the idler lever 82 pivots upward about the shaft 44 in response to the clockwise rotation of the crank 60 the idler lever forcibly causes relative pivoting between the load-supporting frame 12 and main frame 10 in a direction tending to tilt the load-supporting frame downward with respect to the main frame. Conversely, extension of the piston rod 50 returns the frame 12 to its raised position by a reversal of the actions described in the previous two paragraphs.

From the foregoing it will be appreciated that the combination of the crank 60, the connecting links 78 and 88, the idler lever 82 and the rearward extension portion 84 of the load-supporting frame 12 collectively forms a mechanical linkage variably regulating the angular relationship between the main frame 10 and load-supporting frame 12 in response to the degree of rotation of the load-supporting struts 24. The control arms 30 coordinate the angular movement of the crank 60 with that of the struts 24, which angular movement is proportionately reduced by the idler lever 82 to provide a lesser angular movement of the load-supporting frame 12 relative to the main frame 10. Accordingly, as the load-supporting struts 24 rotate forward or rearward as the case may be, to tiltably raise or lower the load-supporting frame 12, the foregoing linkage forcibly causes a corresponding angular change between the load-supporting frame 12 and the main frame 10 to maintain the angular attitude of the main frame 10 substantially constant with respect to the surface 16 upon which the truck is supported.

The improved load-pushing assembly described hereafter, to which the present invention is directed, is indicated generally as 100 in FIG. 1. An upright push frame 102, having a load-pulling capability by virtue of the provision of a slip sheet clamp 104 mounted on the push frame at the bottom thereof, is connected to the main frame 10 by a pair of laterally spaced, selectively extensible and retractable pantographic linkages comprising pivotally interconnected arms 106. The arms 106 extend rearwardly from the push frame 102 to a rear mounting frame 108 fixedly mounted on the main frame 10 so as to be immovable with respect thereto. The pantographic linkages have laterally spaced pairs of front couplings 110 pivotally and slidably mounted within rectilinear channels 112 connected to the rear side of the push frame 102 such that the push frame may move freely in a vertical, rectilinear direction with respect to the arms 106. Pairs of laterally spaced rear couplings 114 interconnect the arms 106 to the rear mounting frame 108. The upper rear couplings are pivotally and slidably mounted in vertical rectilinear channels 116 connected to the front of the rear mounting frame 108, while the lower rear couplings are pivotally, but not slidably, connected to the rear mounting frame by fixed attachment to a shaft 118 pivotally journaled in bushings 120 (FIG. 3) mounted on the front of the rear mounting frame. A hydraulic ram 122 has a cylinder portion 124 pivotally connected to the rear mounting frame 108 by means of a shaft 128 mounted in bushings 130, and a piston rod 126 pivotally connected to a crank 132 fixed to the shaft 118. Extension and retraction of the ram 122 extends and retracts the pantographic linkage and push frame 102 by rotating the shaft 118 and thereby rotating the pair of arms 106 fixedly connected thereto.

The rear mounting frame 108, because of its fixed attachment to the main frame 10, does not tilt in unison with the load-supporting frame 12 but rather maintains a constant angular attitude with respect to the truck-supporting surface 16 in unison with the main frame 10. The pantographic linkages in turn maintain the push frame 102 in a constant angular attitude with respect to the rear mounting frame 108, and thus the truck-supporting surface 16, when the push frame is in the extended position as shown in FIG. 1 because, although the push frame is movable vertically by rectilinear motion with respect to the pantographic linkage as explained previously, it cannot move tiltably or angularly with respect to the linkage, which in turn cannot move angularly with respect to the rear mounting frame 108. Preferably the pantographic linkages, front and rear couplings and associated channels are designed, as shown in FIG. 1, to hold the push frame 102 in an extended attitude wherein the push frame (i.e. the front surface of the push frame) is perpendicular to the truck-supporting surface 16. Moreover the arms 106 of each pantographic linkage are preferably of equal length and intersect one another at pivots 134 and 136 at the mid-points of the respective arms so that the push frame 102 is maintained in a constant angular attitude with respect to the rear mounting frame 108 during forward and rearward movement of the push frame in response to extension and retraction of the pantographic linkage.

In any case it will be appreciated that the maintenance of the push frame 102 in a constant angular attitude with respect to the rear mounting frame 108 by means of the pantographic linkages, and the maintenance of the main frame 10 in a substantially constant angular attitude with respect to the truck-supporting surface 16 during tilting movement of the load-supporting frame 12, results in the maintenance of the push frame 102 at a constant angular attitude with respect to the truck-supporting surface 16 during the tilting movement of the load-supporting frame. This is true even though the push frame 102 is capable of vertical movement with respect to the rear mounting frame 108 due to the sliding connections between the linkage front couplings 110 and the push frame 102, since such couplings permit only rectilinear movement of the push frame and not angular tilting movement of the push frame. Thus the push frame may move between a lowered position shown in solid lines in FIG. 1 and a raised position shown in phantom in FIG. 1, in response to the tilting movement of the load-supporting frame 12, without changing its angular attitude with respect to the load-supporting surface 16.

This feature is particularly important in view of the fact that the push frame 102 is equipped with the aforementioned slip sheet clamp 104 which comprises a lower jaw 138 fixedly attached to the bottom of the push frame 102 and an upper jaw 140 movable vertically with respect to the push frame 102 in response to the extension or retraction of a pair of hydraulic rams 142 mounted on the push frame 102. Such clamp operates by slipping the fixed jaw 138 beneath the protruding edge 144 of a slip sheet 146 positioned beneath a load 22. Once the edge 144 is between the jaws 138 and 140, the rams 142 may be extended to clamp the movable jaw 140 against the fixed jaw 138. It is apparent that the slip sheet clamp 104 can be used effectively only if the fixed jaw 138 is in close proximity to the truck-supporting surface 16 in the extended position of the push frame 102 regardless of the tilted position of the load-supporting frame 12. In the present invention, this is accomplished by virtue of the fact that the push frame 102 is vertically supported by the abutment between the platen 14 and the fixed jaw 138 such that the push frame 102, and both jaws 138 and 140 of the slip sheet clamp 104, move vertically in unison in response to the tilting movement of the load-supporting frame 12 without change in angular attitude of the push frame.

During extension and retraction of the push frame, the fixed jaw 138 of the clamp 104 rides slidably atop the platen 14, again without change in angular attitude of the push frame regardless of the tilted position of the load-supporting frame 12. If the load-supporting frame is in a nonhorizontal position during extension or retraction of the push frame, the push frame 102 merely moves vertically in response to the retraction or extension to compensate for the slope of the platen 14. This is illustrated, for example, by the raised position of the push frame 102 in its retracted position shown in phantom in FIG. 1.

The terms and expressions which have been employed in the abstract and specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. In a mobile lift truck having a main frame adapted for traveling over a truck-supporting surface, a forwardly-extending load-supporting frame tiltably connected to said main frame such that said load-supporting frame articulates with respect to said main frame between a raised, generally horizontal position and a lowered position tilting downward from said main frame, and an upright push frame located above said load-supporting frame and movable forwardly and rearwardly relative to said main frame between extended and retracted positions respectively, the improvement which comprises push frame mounting means for maintaining said push frame, when said push frame is in said extended position, in a substantially constant angular attitude with respect to said truck-supporting surface while permitting said push frame to move vertically with substantially rectilinear motion as said load-supporting frame moves tiltably between said raised and lowered positions respectively.

2. The apparatus of claim 1 wherein said push frame mounting means includes means for maintaining said push frame, when said push frame is in said extended position, substantially perpendicular with respect to said truck-supporting surface while said load-supporting frame moves tiltably between said raised and lowered positions respectively.

3. In a mobile lift truck having a main frame adapted for traveling over a truck-supporting surface, a forwardly-extending load-supporting frame tiltably connected to said main frame such that said load-supporting frame articulates with respect to said main frame between a raised, generally horizontal position and a lowered position tilting downward from said main frame, and a selectively forwardly and rearwardly movable upright push frame located above said load-supporting frame, the improvement which comprises push frame mounting means for maintaining said push frame in a substantially constant angular attitude with respect to said truck-supporting surface while said load-supporting frame moves tiltably between said raised and lowered positions respectively, said push frame mounting means including vertically movable means for permitting said push frame to move vertically with substantially rectilinear motion with respect to said truck-supporting surface without changing said constant angular attitude during the tilting movement of said load-supporting frame.

4. The apparatus of claim 3 wherein said push frame mounting means includes means for maintaining said push frame substantially perpendicular with respect to said truck-supporting surface while said load-supporting frame moves tiltably between said raised and lowered positions respectively.

5. The apparatus of claim 3 wherein said vertically movable means includes means for permitting said push frame to move vertically with respect to said truck-supporting surface without changing said constant angular attitude in response to the tilting movement of said load-supporting frame.

6. The apparatus of claim 5 wherein said push frame is supported vertically by said load-supporting frame and said vertically movable means includes means for permitting said push frame to move freely in a vertical direction with respect to said truck-supporting surface in response to the tilting movement of said load-supporting frame without changing said constant angular attitude.

7. The apparatus of claim 3 further including slip sheet clamp means comprising upper and lower clamp jaws located adjacent the bottom of said push frame for engaging a slip sheet, said clamp mounting means for permitting said upper and lower clamp jaws to move vertically in unison with respect to said truck-supporting surface without changing said constant angular attitude of said push frame during the tilting movement of said load-supporting frame.

8. The apparatus of claim 7 wherein said clamp mounting means includes means for permitting said upper and lower clamp jaws to move vertically in unison with respect to said truck-supporting surface in response to the tilting movement of said load-supporting frame.

9. The apparatus of claim 8 wherein said slip sheet clamp means is supported vertically by said load-supporting frame and said clamp mounting means includes means for permitting said upper and lower clamp jaws to move in unison freely in a vertical direction in response to the tilting movement of said load-supporting frame.

10. The apparatus of claim 9 wherein said push frame is supportably mounted atop said slip sheet clamp means and said push frame is thereby also supported vertically by said load-supporting frame, said vertically movable means including means for permitting said push frame to move freely in a vertical direction in response to the tilting movement of said load-supporting frame without changing said constant angular attitude.

11. The apparatus of claim 3 wherein said push frame mounting means includes means for maintaining said main frame in a substantially constant angular attitude with respect to said truck-supporting surface, and said push frame in a substantially constant angular attitude with respect to said main frame, while said load-supporting frame moves tiltably between said raised and lowered positions respectively.

12. The apparatus of claim 3 wherein said push frame mounting means includes means for maintaining the angular attitude of said push frame with respect to said main frame constant during the forward and rearward movement of said push frame.

13. In a mobile lift truck having a main frame adapted for traveling over a truck-supporting surface, a forwardly-extending load-supporting frame tiltably connected to said main frame such that said load-supporting frame articulates with respect to said main frame between a raised, generally horizontal position and a lowered position tilting downward from said main frame, and an upright push frame located above said load-supporting frame and movable forwardly and rearwardly relative to said main frame between extended and retracted positions respectively, the improvement which comprises:

(a) linkage means interconnecting said push frame with said main frame for maintaining said push frame in a substantially constant angular attitude with respect to said main frame and permitting said push frame to move vertically with substantially rectilinear motion when said push frame is in said extended position while said load-supporting frame moves tiltably between said raised and lowered positions respectively; and (b) means for maintaining said main frame in a substantially constant angular attitude with respect to said truck-supporting surface during the tilting movement of said load-supporting frame so that said push frame in said extended position is thereby also maintained in a substantially constant angular attitude with respect to said truck-supporting surface during the tilting movement of said load-supporting frame.

14. The apparatus of claim 13 wherein said linkage means includes means for permitting said push frame to move vertically in said extended position with respect to said truck-supporting surface during the tilting movement of said load-supporting frame while maintaining said push frame in said predetermined angular attitude with respect to said main frame.

15. The apparatus of claim 13 wherein said means (a) and (b) comprise means for maintaining said push frame, when in said extended position, substantially perpendicular with respect to said truck-supporting surface while said load-supporting frame moves tiltably between said raised and lowered positions respectively.

16. The apparatus of claim 13 wherein said linkage means includes means for maintaining said push frame in said constant angular attitude with respect to said main frame during forward and rearward movement of said push frame.

17. The apparatus of claim 13 wherein said linkage means comprises a pair of arms extending forwardly and rearwardly between said main frame and said push frame and pivoted to one another at a point intermediate the ends thereof, said arms having a pair of rear coupling means interconnected to said main frame and a pair of front coupling means connected to said push frame, one of said pair of coupling means permitting free vertical movement of said push frame relative to said main frame without change in said constant angular attitude of said push frame with respect to said main frame.

18. The apparatus of claim 17 wherein said pair of front coupling means permits free vertical movement of said push frame relative to said linkage means and main frame.

19. The apparatus of claim 17 including slip sheet clamp means, for engaging a slip sheet, connected to said push frame adjacent the bottom thereof such that said clamp means moves vertically in unison with said push frame, and wherein said push frame and clamp means are supported vertically by said load-supporting frame so as to move vertically in response to the tilting movement of said load-supporting frame.

* * * * *